United States Patent
Kakutani

(10) Patent No.: US 8,896,851 B2
(45) Date of Patent: Nov. 25, 2014

(54) APPARATUS FOR DEALING WITH A CODE AND A CONTROL METHOD OF THE APPARATUS

(75) Inventor: Naoya Kakutani, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/305,044

(22) Filed: Nov. 28, 2011

(65) Prior Publication Data

US 2012/0140258 A1 Jun. 7, 2012

(30) Foreign Application Priority Data

Dec. 2, 2010 (JP) ................. 2010-269399

(51) Int. Cl.
- *G06F 3/12* (2006.01)
- *H04N 1/32* (2006.01)
- *G06F 21/60* (2013.01)

(52) U.S. Cl.
CPC .... *H04N 1/32133* (2013.01); *H04N 2201/3269* (2013.01); *H04N 2201/3271* (2013.01); *H04N 2201/3205* (2013.01); *G06F 21/608* (2013.01)
USPC ........................................ 358/1.13; 358/1.15

(58) Field of Classification Search
CPC ........... H04L 9/00; G06K 15/02; G06K 15/00
See application file for complete search history.

(56) References Cited

U.S. PATENT DOCUMENTS

| | | | |
|---|---|---|---|
| 5,467,447 A | 11/1995 | Vogel | |
| 5,987,127 A * | 11/1999 | Ikenoue et al. | 358/401 |
| 7,200,245 B2 | 4/2007 | Miyashita | |
| 2006/0001912 A1* | 1/2006 | Miyashita | 358/3.28 |
| 2008/0231907 A1* | 9/2008 | Ishii | 358/3.28 |
| 2010/0142000 A1 | 6/2010 | Haraguchi | |

FOREIGN PATENT DOCUMENTS

| | | |
|---|---|---|
| EP | 1796368 A1 | 6/2007 |
| JP | 2010-136098 A | 6/2010 |

* cited by examiner

*Primary Examiner* — Barbara Reinier
*Assistant Examiner* — Henok A Shiferaw
(74) *Attorney, Agent, or Firm* — Canon USA, Inc. IP Division

(57) ABSTRACT

One aspect of the present invention relates to copying a paper document including no information in the original user information area and also no information in the latest user information area. Another aspect of the present invention relates to copying document including no information in the original user information area but some information in the latest user information area.

3 Claims, 4 Drawing Sheets

FIG. 4

| | (I) | (II) | (III) | (IV) |
|---|---|---|---|---|
| OBTAINED CODE INFORMATION (=CODE INFORMATION OBTAINED BY DECODING THE DETECTED CODE) | Original: no<br>Latest: no | Original: no<br>Latest: A | Original: A<br>Latest: no | Original: A<br>Latest: B |
| E1 GENERATED CODE INFORMATION | Original: log-in user<br>Latest: no | Original: log-in user<br>Latest: A | Original: A<br>Latest: log-in user | Original: A<br>Latest: log-in user |
| E2 GENERATED CODE INFORMATION | Original: log-in user<br>Latest: no | Original: A<br>Latest: log-in user | Original: A<br>Latest: log-in user | Original: A<br>Latest: log-in user |
| E3 GENERATED CODE INFORMATION | Original: log-in user<br>Latest: no | Original: no<br>Latest: log-in user | Original: A<br>Latest: log-in user | Original: A<br>Latest: log-in user |
| E4 GENERATED CODE INFORMATION | Original: no<br>Latest: log-in user | Original: log-in user<br>Latest: A | Original: A<br>Latest: log-in user | Original: A<br>Latest: log-in user |
| E5 GENERATED CODE INFORMATION | Original: no<br>Latest: log-in user | Original: A<br>Latest: log-in user | Original: A<br>Latest: log-in user | Original: A<br>Latest: log-in user |
| E6 GENERATED CODE INFORMATION | Original: no<br>Latest: log-in user | Original: no<br>Latest: log-in user | Original: A<br>Latest: log-in user | Original: A<br>Latest: log-in user |

APPARATUS FOR DEALING WITH A CODE AND A CONTROL METHOD OF THE APPARATUS

BACKGROUND OF THE INVENTION

1. Field of the Invention

The present invention relates to an apparatus and a method for processing a code related to user information.

2. Description of the Related Art

A security level of a paper document is lower than that of a data file. For improving the security level of a paper document, the technology for printing user information identifying who produced the paper document is applied. In doing so, the paper document is not to be hand out indiscriminately.

Japanese Patent Laid-Open Application No. 2010-136098 (hereinafter '098) discloses a multi functional printer (MFP) printing a code including two areas (but not three or more). The each area may include user information. One of the two areas is called the original user information area. The other is called the latest user information area.

In '098, the code is generated by encoding code information including two blocks where one is called an original user information block and the other is called a latest user information block. The original user information block corresponds to the original user information area, and the latest user information block corresponds to the latest user information area.

FIG. 2 represents the generated code information. Code information 201 is generated when A instructs printing. Code information 202 is generated when B instructs copying. Code information 203 is generated when C instructs copying.

In details, when the MFP prints document by the instruction of A, the MFP generates the code information 201 including user information identifying who instructs the printing (i.e. A) in the original user information block and no user information in the latest user information block. And then, the MFP generates a code by encoding the code information 201. Finally, the MFP synthesizes the code and the document, and prints the synthesized result to produce a paper document.

When the MFP copies the paper document by the instruction of B, the MFP captures (e.g., scans) the image of the paper document, deletes the code from the captured image and generates a new code information 202 including the same user information (i.e. A) in the original user information block and user information (i.e. B) identifying who instructs the copying in the latest user information block. Thereafter, the MFP generates a new code by encoding the new code information 202. Finally, the MFP synthesizes the new code and the captured image, and prints the new synthesized result to produce a renewed paper document.

When the MFP copies the renewed paper document by the instruction of C, the MFP captures the image of the renewed paper document, and deletes the new code from the captured image and generates another new code information 203 including the same user information (i.e. A) in the original user information block and user information identifying who instructs copying this time (i.e. C) in the latest user information block. Thereafter, the MFP generates another new code by encoding the other new code information 203. Finally, the MFP synthesizes the other new code and the captured image, and prints the synthesized result to produce a further renewed paper document.

In this way, the MFP prints a code including the oldest user information such as A in the original user information area and the latest user information such as C in the latest user information area.

However, the application does not disclose the case where the MFP copies a paper document including no information in the original user information area and also no information in the latest user information area (see the (I)'s obtained code information in FIG. 4).

Also, the application does not disclose the case where the MFP copies a paper document including no information in the original user information area but some information in the latest user information area (see the (II)'s obtained code information in FIG. 4).

SUMMARY OF THE INVENTION

According to one aspect of the present invention, an apparatus includes an operating unit which receives an instruction for copying a paper document, a capturing unit which captures the paper document to obtain a captured image after reception of the instruction, a detecting unit which detects a first code, including no user information both in an original user information area and a latest user information area, from the captured image, a generating unit which generates a second code including user information about a user in the original user information area or the latest user information area in a case where the first code is detected, and a printing unit which prints the second code.

According to another aspect of the present invention, an apparatus includes an operating unit which receives instruction for copying a paper document, a capturing unit which captures the paper document to obtain a captured image after reception of the instruction, a detecting unit which detects a first code, including no user information in the original user information area and user information in the latest user information area, from the captured image, a generating unit which generates a second code including user information in the original user information area and user information about the user in the latest user information area in a case where the first code is detected, and a printing unit which prints the second code.

Further features and aspects of the present invention will become apparent from the following description of exemplary embodiments with reference to the attached drawings.

BRIEF DESCRIPTION OF THE DRAWINGS

FIG. 4 illustrates relationships between the obtained code information and the generated code information in the embodiments

DESCRIPTION OF THE EMBODIMENTS

The code information generated when the (I)'s code information is obtained by decoding the detected code and the code information generated when the (II)'s code information is obtained by decoding the detected code will be understood in FIG. 4. The E1 represents the generated code information in the first embodiment. The E2 represents the generated code information in the second embodiment. Similarly, the E3 through E6 represents the generated code information in the third through sixth embodiment.

In the following embodiments, the area size of a code is predetermined and therefore, the data size that the code can include is limited. Specifically, the code can include two (but not three or more) pieces of user information. In other words, the code includes two areas (but not three or more). The each area may include user information. One of the two areas is called an original user information area. The other is called a latest user information area.

The above descriptions for explaining the Japanese Patent Laid-Open Application No. 2010-136098 are applied to the embodiments of the present invention.

According to the above descriptions, the information in the original user information area is not modified each time a paper document is copied. On the other hand, the information in the latest user information area is modified each time a paper document is copied.

Therefore, the original user information area is sometimes called the area in which information is not modified each time a paper document is copied. And, the latest user information area is sometimes called the area in which information is modified each time a paper document is copied.

In the following embodiments, the MFP is an apparatus comprising a scanning unit (e.g. a scanner) to capture an image and a printing unit (e.g. a printer engine). Furthermore, it may comprise a controlling unit (e.g. a CPU), a storing unit (e.g. a Hard Disk, a memory), a displaying unit (e.g. a display), an operating unit (e.g. a button, a touch panel, a keyboard or a mouse) and a network interface.

In the following embodiments, the MFP may store user information specifying a log-in user by executing log-in authentification function. This function is executed by cooperation of the above mentioned units.

In the following embodiments, the user information specifying a log-in user is called as log-in user information.

The First Embodiment

Figure 1:
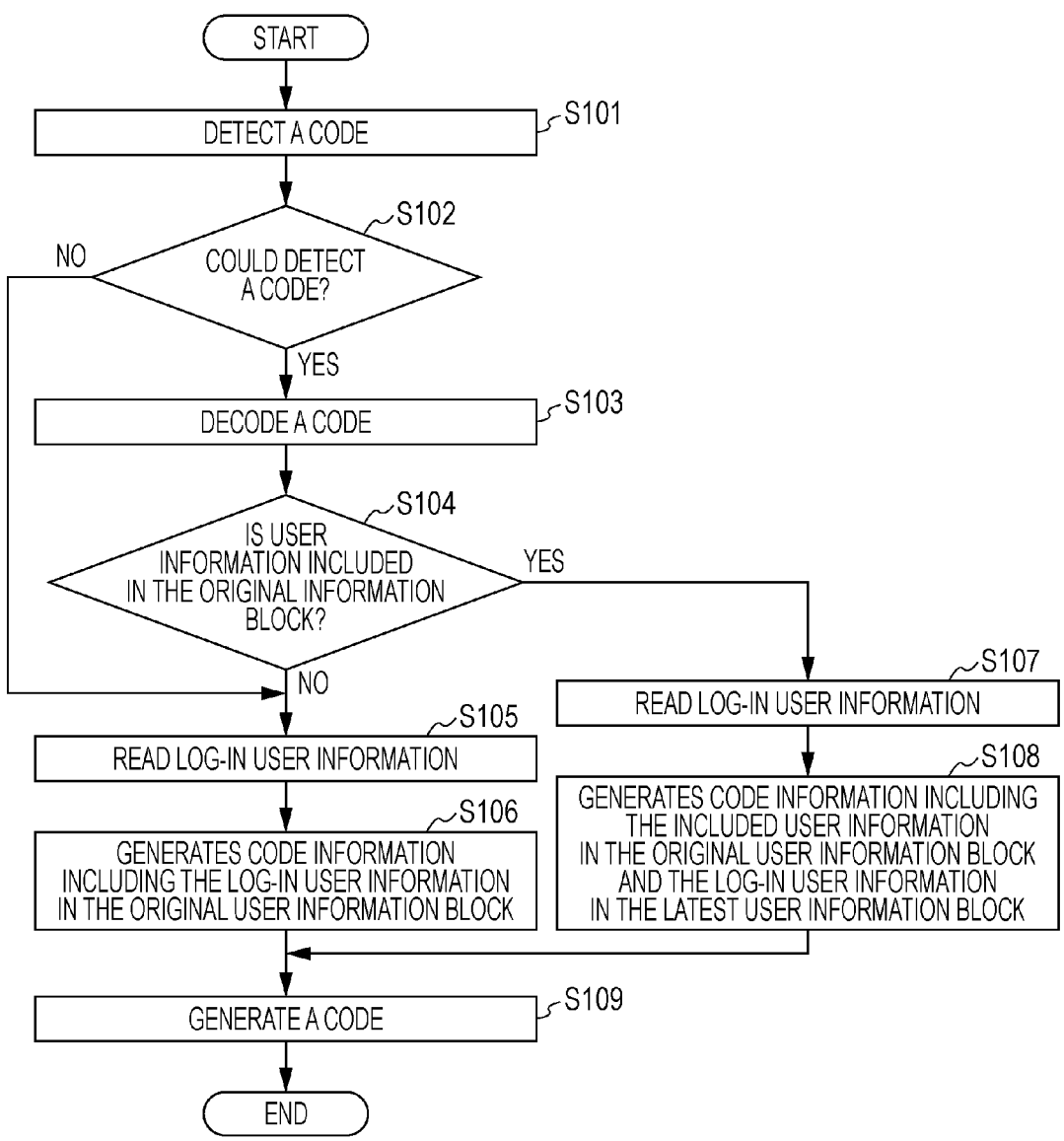
FIG. 1 is a flowchart illustrating steps executed by an MFP in the first embodiment.
Figure 2:
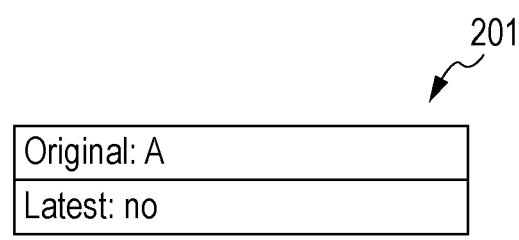
FIG. 2 is a diagram illustrating the generated code information.
Figure 2:
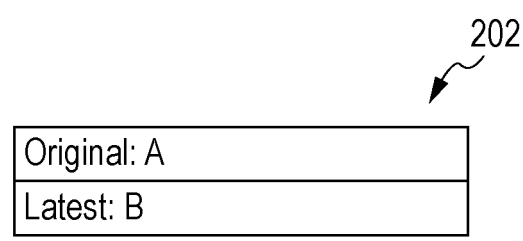
Figure 2:

FIG. 1 is a flowchart illustrating steps executed after executing log-in authentification, user's instructing for copying a paper document, and capturing the paper document. By executing this flowchart, the code information represented by the E1 is generated and printed after the code information is encoded.

In S101, the controlling unit detects a code from the captured image. In S102, the controlling unit determines whether a code is detected in the captured image. If the code is not detected (NO), then the process proceeds to S104. Otherwise, the process continues to S103.

In S103, the controlling unit decodes the detected code to obtain code information, and stores the obtained code information. In S104, the controlling unit determines whether user information is included in an original user information block of the obtained code information. If NO, the process continues to S105. However, if the user information is included in the original information block, the process proceeds to S107.

Specifically, the controlling unit determines that user information is not included in the original user information block when the information indicating that there is no user information is included in the original user information block. It is determined that the information indicates that there is no user information is in the block when the block contains all zeros (i.e., for an 8-bit block, "00000000").

In S105, the controlling unit reads the stored log-in user information from the storing unit. In S106, the controlling unit generates code information including the read log-in user information in the original user information block. Then, in S109, the controlling unit generates a code by encoding the generated code information.

In addition, in S104, the controlling unit may determine whether user information is included in the latest user information block of the obtained code information.

And when it is not included, the controlling unit in S106 generates code information including the read log-in user information in the original user information block and no information in the latest user information block (see (I) of the E1).

And when it is included, the controlling unit in S106 generates code information including not only the read log-in user information in the original user information block, but also the included user information (i.e. A) in the latest user information block (see (II) of the E1).

When any code is not detected (S102:No), the controlling unit in S106 generates code information including the read log-in user information in the original user information block and no information in the latest user information block.

In S107, the controlling unit reads the stored log-in user information from the storing unit.

In S108, the controlling unit generates code information including the included user information (i.e. A) in the original user information block and the read log-in user information in the latest user information block (see (III) and (IV) of the E1). The controlling unit may execute S108 by modifying information in the latest user information block of the obtained code information. In this case, the controlling unit needs to delete user information (if existed) in the latest user information block of the obtained code information before inputting the read log-in user information into the latest user information block.

After S109, the controlling unit synthesizes the generated code and captured image, and instructs the printing unit print the synthesized result. In this synthesizing process, the controlling unit synthesizes the generated code in the area of the detected code (if detected) of the captured image so as to delete the detected code.

The Second Embodiment

Figure 3:
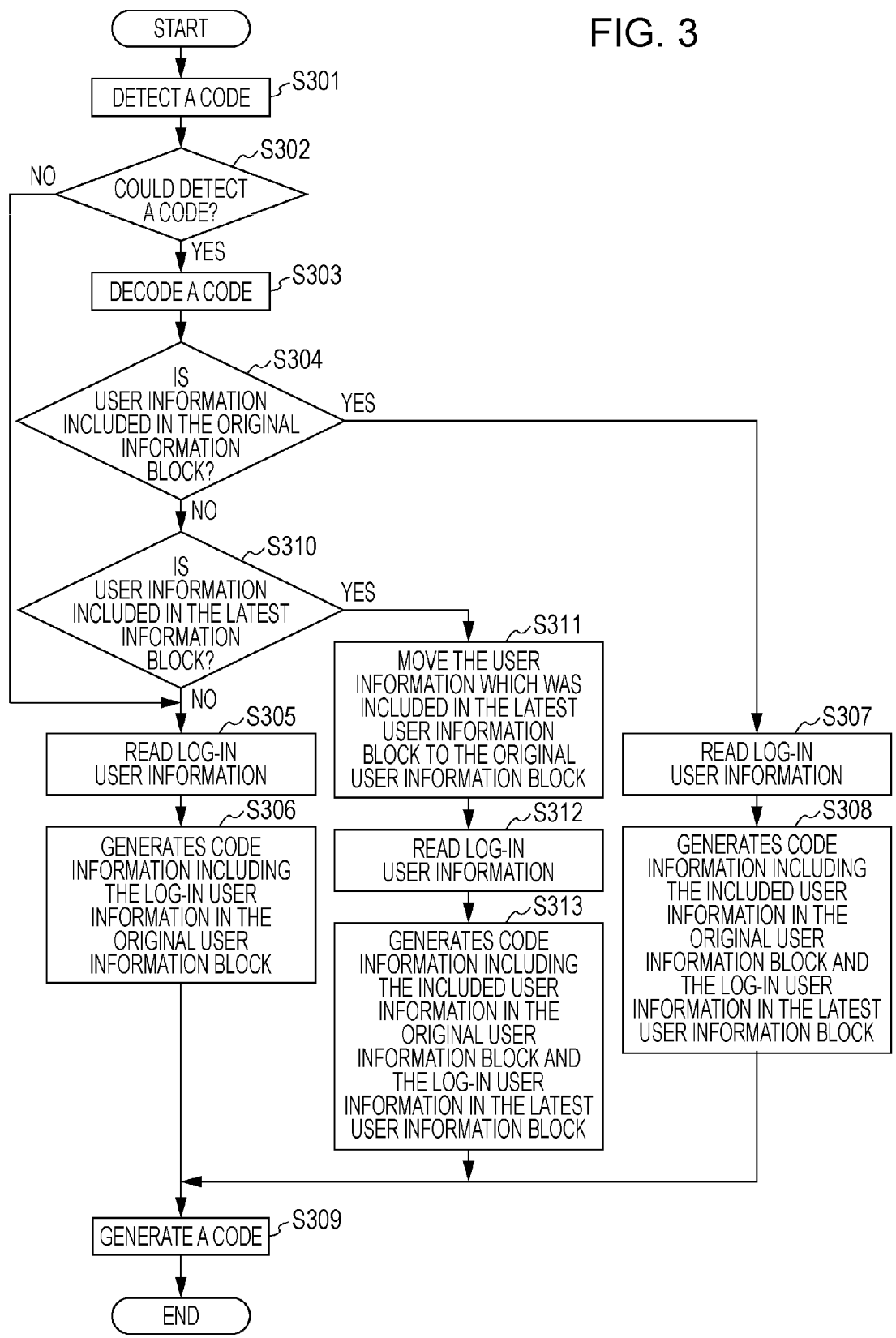
FIG. 3 is a flowchart illustrating steps executed by an MFP in the second embodiment.

FIG. 3 is a flowchart illustrating steps executed in this embodiment after executing log-in authentification, user's instructing for copying a paper document, and capturing the paper document. The generated code information in the (II) case in this embodiment is different from that in the (II) case in the first embodiment (see (II) of the E1 and E2).

In S301, the controlling unit detects a code from captured information. In S302, the controlling unit determines whether a code is detected. If the code is not detected (NO), the process proceeds to S305. Otherwise, the process continues to S303.

In S303, the controlling unit decodes the detected code to obtain code information, and stores the obtained code information. In S304, the controlling unit determines whether user information is included in the original user information block of the obtained code information. If the information is not included (NO), the process continues to S310, if the information is included (YES), the process proceeds to S307.

In S310, the controlling unit determines whether user information is included in the latest user information block of the obtained code information. If the user information is not included (NO), the process proceeds to S305. Otherwise, the process proceeds to S311.

In S305, the controlling unit reads the stored log-in user information from the storing unit. In S306, the controlling unit generates code information including (i) the read log-in user information in the original user information block and (ii) no information in the latest user information block (see (I)

of the E2). Thereafter, in S309, the controlling unit generates a code by encoding the generated code information.

In S311, the controlling unit moves the user information which is included in the latest user information block of the obtained code information to the original user information block. In S312, the controlling unit reads the stored log-in user information from the storing unit. In S313, the controlling unit generates code information including the input user information (i.e. A) in the original user information block and the read log-in user information in the latest user information block (see (II) of the E2). Then, in S309, the controlling unit generates a code by encoding the generated code information.

In S307, the controlling unit reads the stored log-in user information from the storing unit. In S308, the controlling unit generates code information including the included user information in the original user information block (i.e. A) and the read log-in user information in the latest user information block (see (III) and (IV) of the E2).

After S309, the controlling unit synthesizes the generated code and captured information, and instructs the printing unit print the synthesized result. In this synthesizing process, the controlling unit may synthesize the generated code in the area of the detected code (if detected) of the captured image so as to delete the detected code.

The Third Embodiment

The generated code information in the (II) case in this embodiment is different from that in the (II) case in the second embodiment. Specifically, no information is included in the original user information block in the generated code information in this embodiment.

In order to generate this code information, the processing of the S311 and S313 in this embodiment is different from that of the second embodiment.

In S311 in this embodiment, the controlling unit deletes the user information in the latest user information block of the obtained code information.

In S313 in this embodiment, the controlling unit generates code information including no information in the original user information block and the read log-in user information in the latest user information block (see (II) of the E3).

The Forth Embodiment

The generated code information in the (I) case in this embodiment is different from that in the (I) case in the first embodiment. Specifically, the log-in user information is included in the latest user information block in the generated code information in this embodiment.

In order to generate this code information, the processing of the S106 in this embodiment is different from that in the first embodiment.

In S104, the controlling unit determines whether user information is included in the latest user information block of the obtained code information. It is same with the processing of the first embodiment.

When it is not included, the controlling unit in S106 may generate code information including no information in the original user information block and log-in user information in the latest user information block (see (I) of the E4). It is different from the processing of the first embodiment.

And when it is included, the controlling unit in S106 may generate code information including not only the read log-in user information in the original user information block, but also the included user information (i.e. A) in the latest user information block (see (II) of the E4). It is different from the processing of the first embodiment.

And when any code is not detected (S102:NO), the controlling unit in S106 generates code information including the read log-in user information in the original user information block and no information in the latest user information block. It is same with the processing of the first embodiment.

The Fifth Embodiment

The generated code information in the (I) case in this embodiment is different from that in the (I) case in the second embodiment. Specifically, the log-in user information is included in the latest user information block in the generated code information in this embodiment. In order to generate this code information, the processing of the S306 in this embodiment is different from that of the second embodiment.

In S306, the controlling unit generates code information including no user information in the original user information block and the read log-in information in the latest user information block (see (I) of the E5).

The Sixth Embodiment

The generated code information in the (I) case in this embodiment is different from that in the (I) case in the third embodiment. Specifically, the log-in user information is included in the latest user information block in the generated code information in this embodiment. In order to generate this code information, the processing of the S306 in this embodiment is different from that of the third embodiment.

In S306, the controlling unit generates code information including no user information in the original user information block and the read log-in information in the latest user information block.

The Seventh Embodiment

As described above, the generated code information is different from the first embodiment through the sixth embodiment. In this seventh embodiment, a user (or preferably a system manager) can select one option among the six options before capturing. When the operating unit receives the selection of one option, the option is stored in the storing unit. And then, the controlling unit runs the flow corresponding to the stored option. For example, when the user selects the first option, the controlling unit runs the flowchart in the FIG. 1.

Comparison of Embodiments from the First Embodiment to the Sixth Embodiment

Among these embodiments, the second embodiment is the best mode.

Firstly, this is because the second embodiment generates a code information including this time's log-in user information in the original user information block in the (I) case. As described above, information in the original user information area is not modified each time a paper document is copied. Accordingly, even though the paper document is copied many times, the produced paper document includes this time's log-in user. So, when someone finds out that the produced paper document is revealed to the outside world, that someone specifies this time's log-in user. In this result, the someone can ask how this time's log-in user obtains the original paper document (i.e. the paper document including a code including no information both in the areas). By this asking, that someone may specify and blame the person who prints document which should be under lock and key (i.e. which should not be printed). As a result, members in any office stop printing important document because they don't want to be blamed.

Secondly, this is because the second embodiment generates a code including Mr. A in the original user information area in the (II) case. When Mr. A is compared with this time's log-in user, Mr. A should be blamed because Mr. A may print document which should be under lock and key but this time's log-in user just copied.

Other Embodiments

In the other embodiments, the code can include not only two (but not three or more) pieces of user information but also two (but not three or more) pieces of tracking information. In other words, the code includes two areas (but not three or more), the each area being capable of including user information and tracking information. One of the two areas is called the original information area. The other is called the latest information area.

In the other embodiments, please note that when there is user information or tracking information in one area, it is determined that the area includes the information.

As a result, even though user information in the original information area is not included, it is determined affirmative (Yes) in S104 if tracking information is included in the original information area. The same holds true for other steps.

The tracking information may include printing date (or time) or MFP's name (or model number).

The other embodiments include seven embodiments from the eighth embodiment to the fourteenth embodiment. The eighth embodiment corresponds to the first embodiment although these are different in the four points from (1) to (4). The ninth embodiment corresponds to the second embodiment although these are different in the four points from (1) to (4). The same holds true for other embodiments from the tenth embodiment to fourteenth embodiment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-269399, filed Dec. 2, 2010 which is hereby incorporated by reference herein in its entirety.

What is claimed is:

1. A copying apparatus for dealing with an original code and a new code, both having two areas for holding user information, the apparatus comprising:
an receiving unit configured to receive a log-in user's instruction for copying a document which has the original code holding no user information in an area and original user information in the other area;
a capturing unit configured to capture the document to obtain a captured image after reception of the instruction;
a detecting unit configured to detect the original code holding no user information in the area and the original user information in the other area from the captured image;
a generating unit configured to generate the new code holding the original user information in the area which held no user information in the original code and user information about the log-in user in the other area which held the original user information in the original code; and
a printing unit configured to print the new code generated in the generating unit to obtain the copy of the document.

2. A copying method for dealing with an original code and a new code, both having two areas for holding user information, the method comprising:
receiving a log-in user's instruction for copying a document which has the original code holding no user information in an area and original user information in the other area;
capturing the document to obtain a captured image after reception of the instruction;
detecting the original code holding no user information in the area and the original user information in the other area from the captured image;
generating the new code holding the original user information in the area which held no user information in the original code and user information about the log-in user in the other area which held the original user information in the original code; and
printing the generated new code to obtain the copy of the document.

3. A non-transitory computer readable medium storing a computer readable program for executing the method according to claim 2.

* * * * *